Dec. 11, 1928.                                    1,694,958
O. M. WILSON
EXTENSION SIDE FOR PANS
Filed Jan. 20, 1928
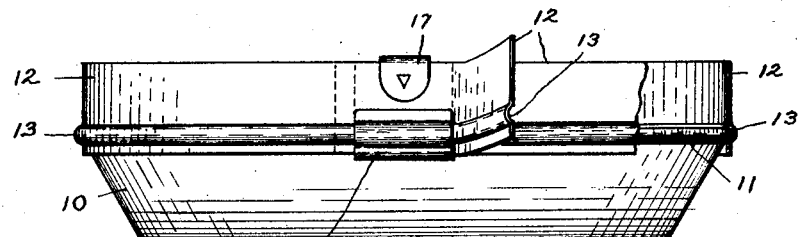
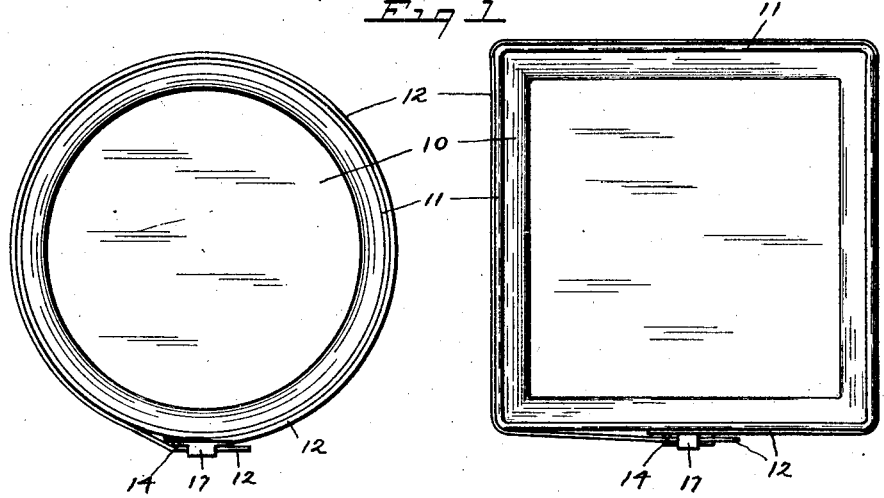
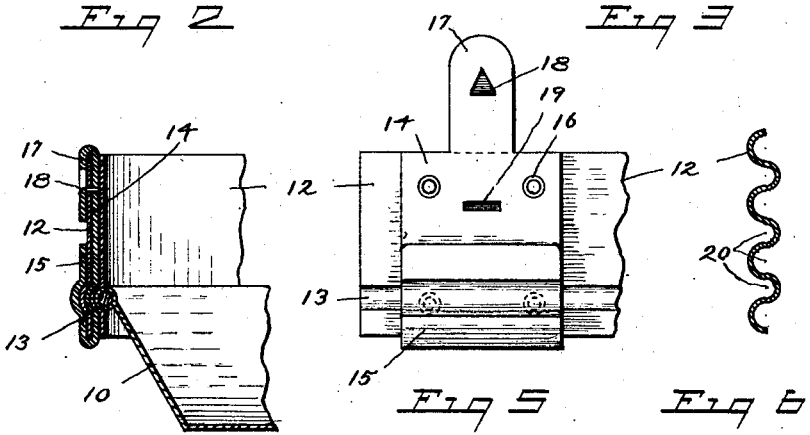
INVENTOR.
Onnolee Magee Wilson
BY
ATTORNEYS.

Patented Dec. 11, 1928.

1,694,958

UNITED STATES PATENT OFFICE.

ONNOLEE MAGEE WILSON, OF WILTON, CONNECTICUT.

EXTENSION SIDE FOR PANS.

Application filed January 20, 1928. Serial No. 248,186.

This invention relates to an extension side for pans of that class used for the baking of pies, cakes, etc., and where it is desired to increase the depth of the pan, either for the purpose of baking a deeper pie, or to prevent the escape of the juice while the pie is baking, and also to prevent the edges of the crust from burning.

The object of the invention is to provide an extension side which is adjustable and may be quickly attached to any pie pan, or cake pan, either round or oblong.

Another object being to provide a device of this kind that due to the kind of material of which it is made, and its cheapness, may be used once and discarded, thus doing away with the necessity of cleaning.

Still a further object of the invention being to provide a device of this kind that may be used as an advertising means for cooking materials, etc.

With these and other objects in view, my invention consists in certain construction and combination of parts as will hereinafter be fully described and claimed, and illustrated in the accompanying drawings which form a part hereof and in which like figures of reference refer to corresponding parts in all of the views, and it is understood that slight changes may be made without departing from the spirit of the invention.

In the drawings:—

Figure 1 shows a side elevation of a baking pan, partly in section, and with the device in place thereon.

Figure 2 shows a top plan view of a round pan with the device attached thereto.

Figure 3 shows a top plan view of a square are rectangular pan, with the device attached thereto.

Figure 4 is an enlarged detail sectional view of the device taken through the clamp, showing the construction.

Figure 5 is a front elevation of the clamp, with the tongue in an open position.

Figure 6 is a cross sectional view of a band formed with a series of grooves.

Referring to the drawings, a baking pan, either round or square is indicated by the numeral 10, said pan being formed with the usual rounded or rolled edge 11.

The device comprises a flexible band of the desired width, thickness and length, and intended to be made of a heavy grade of paper, paper board, fiber, asbestos, or other suitable material, which may be plain or treated with wax, paraffin, or a fire proofing material.

Near one edge of said band is formed one or more grooves 13, which are parallel with the edge and with each other and are for the purpose of embracing the edge 11 of the pan 10; and while in the figures only one groove is shown, it will be seen by reference to Figure 6 of the drawings that this band 12 may be formed with the series of grooves 20, so that any one of them may be used thus making the band 12 have a vertical adjustment with respect to the pan.

One end of said band 12 is attached by the eyelets 16 or other suitable means to a clamp, comprising a plate 14 which is formed with a turned up portion 15 forming a guide; both the plate 14 and the guide plate 15 being formed with grooves to register with each other and that of the band 12.

Said band 12 is further formed with a tongue 17, having a spur 18 formed therein, which when the tongue 17 is bent over on the adjustable end of the band 12 will pierce through the same and enter a slot 19 formed in the body of the plate 14, thus locking the band to the plate.

In employing a cheap material such as paper for the band the idea is that the article will be furnished in quantity and at such a small price that a band may only be used once and discarded, but should it be desired to use the device a number of times, the tongue 17 will stand being bent outward to release the end of the band to remove same from the pan or for adjustment.

Also advertising matter may be placed on the band, or other printed matter if desired; or the band may be made from a light metal, and the clamp be an integral part thereof.

Having thus described my invention, what

I claim as new and desire to secure by Letters Patent, is:—

In an extension side for pans, and in combination with a band of flexible material such as paper and formed with a groove for engagement with the edge of the pan, of a clamp comprising a plate permanently secured to one end of said band, a guide formed on said plate to receive the free end of said band, a tongue formed on said plate and adapted to be folded over on said free end of said band, and a spur formed on said tongue and adapted to engage said free end of said band and lock the same in place.

In testimony whereof I affix my signature.

ONNOLEE MAGEE WILSON.